(12) United States Patent
Huff

(10) Patent No.: US 10,864,804 B2
(45) Date of Patent: Dec. 15, 2020

(54) SLIDING THIN VISOR

(71) Applicant: IRVIN AUTOMOTIVE PRODUCTS, LLC, Pontiac, MI (US)

(72) Inventor: David Huff, Waterford, MI (US)

(73) Assignee: IRVIN AUTOMOTIVE PRODUCTS, LLC, Pontiac, MI (US)

( * ) Notice: Subject to any disclaimer, the term of this patent is extended or adjusted under 35 U.S.C. 154(b) by 0 days.

(21) Appl. No.: 16/288,579

(22) Filed: Feb. 28, 2019

(65) Prior Publication Data
US 2020/0276887 A1 Sep. 3, 2020

(51) Int. Cl.
*B60J 3/02* (2006.01)
*B60R 1/12* (2006.01)
*B60Q 3/252* (2017.01)

(52) U.S. Cl.
CPC ........... *B60J 3/0282* (2013.01); *B60J 3/0204* (2013.01); *B60J 3/0213* (2013.01); *B60Q 3/252* (2017.02); *B60R 2001/1269* (2013.01)

(58) Field of Classification Search
CPC ...... B60J 3/0234; B60J 3/0282; B60J 3/0213; B60J 3/0204; B60Q 3/252; B60R 16/027
USPC .................................... 296/97.11, 97.5, 97.1
See application file for complete search history.

(56) References Cited

U.S. PATENT DOCUMENTS

| 3,710,674 | A | 1/1973 | Tabor |
| 3,926,470 | A | 12/1975 | Marcus |
| 4,000,404 | A | 12/1976 | Marcus |
| 4,174,864 | A | 11/1979 | Viertel et al. |
| 4,227,241 | A | 10/1980 | Marcus |
| 4,479,172 | A | 10/1984 | Connor |
| 4,521,046 | A | 6/1985 | Foggini |
| 4,533,275 | A | 8/1985 | Foggini |
| 4,598,943 | A | 7/1986 | Scholz et al. |
| 4,617,699 | A | 10/1986 | Nakamura |
| 4,679,843 | A | 7/1987 | Spykerman |
| 4,715,644 | A | 12/1987 | Lobanoff et al. |
| 4,729,590 | A | 3/1988 | Adams |
| 4,756,570 | A | 7/1988 | Cooper |
| 4,760,503 | A | 7/1988 | VandenBerge |
| 4,879,637 | A | 11/1989 | Clark et al. |
| 4,925,233 | A | 5/1990 | Clark |
| 4,973,020 | A | 11/1990 | Canadas |
| 4,993,772 | A | 2/1991 | Charen |
| 4,997,228 | A | 3/1991 | Kempkers |
| 4,998,765 | A | 3/1991 | Van Onder et al. |

(Continued)

FOREIGN PATENT DOCUMENTS

| JP | 10151944 | 6/1998 |
| JP | 2001322428 | 11/2001 |

(Continued)

*Primary Examiner* — Joseph D. Pape
(74) *Attorney, Agent, or Firm* — Raggio & Dinnin, P.C.

(57) ABSTRACT

A sliding thin visor for a vehicle comprising a pivot rod and a first and second shell being engagable to form a visor body. The visor comprises a rail extending from a surface of the first shell and a carrier slidably positioned in the visor body, wherein that carrier is engaged with the rail. The visor also may comprise a detent assembly having a generally mailbox shape attached to the carrier. The thin visor generally has a width of approximately seventeen to eighteen millimeters and allows for a clean small profile ergonomically designed visor to be arranged within a vehicle.

18 Claims, 14 Drawing Sheets

(56) References Cited

U.S. PATENT DOCUMENTS

| | | | |
|---|---|---|---|
| 5,011,211 A | 4/1991 | Svensson | |
| 5,054,839 A * | 10/1991 | White | B60J 3/0278 296/97.1 |
| 5,059,016 A | 10/1991 | Lawassani | |
| 5,078,445 A | 1/1992 | VandenBerge | |
| 5,082,322 A | 1/1992 | Cekander et al. | |
| 5,161,850 A | 11/1992 | Reeder et al. | |
| 5,184,867 A | 2/1993 | Prillard | |
| 5,230,546 A | 7/1993 | Smith | |
| 5,232,192 A | 8/1993 | Akutagawa | |
| 5,331,518 A | 7/1994 | Roark | |
| 5,340,186 A | 8/1994 | Aymerich | |
| 5,409,285 A | 4/1995 | Snyder et al. | |
| 5,428,513 A | 6/1995 | Hiemstra et al. | |
| 5,445,427 A | 8/1995 | Vandagriff | |
| 5,486,033 A | 1/1996 | Lecorvaisier | |
| 5,544,928 A | 8/1996 | Mori et al. | |
| 5,556,154 A | 9/1996 | Vaxelaire | |
| 5,560,704 A | 10/1996 | Hiemstra et al. | |
| 5,575,552 A | 11/1996 | Faloon | |
| 5,580,117 A | 12/1996 | Goclowski | |
| 5,580,118 A | 12/1996 | Crotty, III | |
| 5,645,308 A | 7/1997 | Fink | |
| 5,653,490 A | 8/1997 | Fink et al. | |
| 5,653,496 A | 8/1997 | Mori et al. | |
| 5,660,424 A | 8/1997 | Aymerich et al. | |
| 5,685,629 A | 11/1997 | Hemmeke et al. | |
| 5,820,197 A | 10/1998 | Lanser | |
| 5,823,603 A | 10/1998 | Crotty, III | |
| 5,855,443 A | 1/1999 | Faller et al. | |
| 5,951,091 A | 9/1999 | VanderKuyl et al. | |
| 5,967,587 A | 10/1999 | Collet et al. | |
| 5,967,588 A | 10/1999 | Collet et al. | |
| 6,010,174 A | 1/2000 | Murdock et al. | |
| 6,010,175 A | 1/2000 | Bodar et al. | |
| 6,012,757 A | 1/2000 | Viertel et al. | |
| 6,024,399 A | 2/2000 | Viertel et al. | |
| 6,059,348 A | 5/2000 | Viertel et al. | |
| 6,131,985 A | 10/2000 | Twietmeyer et al. | |
| 6,135,610 A | 10/2000 | Beck et al. | |
| 6,139,083 A | 10/2000 | Fischer et al. | |
| 6,174,019 B1 | 1/2001 | Collet et al. | |
| 6,189,949 B1 | 2/2001 | Miller et al. | |
| 6,220,644 B1 | 4/2001 | Tiesler et al. | |
| 6,264,264 B1 | 7/2001 | Kato et al. | |
| 6,264,352 B1 | 7/2001 | Zapinski | |
| 6,325,443 B1 | 12/2001 | Sanchez | |
| 6,334,626 B2 | 1/2002 | Nakajima et al. | |
| 6,368,114 B1 | 4/2002 | Inoue | |
| 6,371,546 B1 | 4/2002 | Jefferson | |
| 6,382,697 B1 | 5/2002 | Mulder et al. | |
| 6,435,593 B2 | 8/2002 | Welter | |
| 6,439,638 B1 | 8/2002 | Kawasaki et al. | |
| 6,464,381 B2 | 10/2002 | Anderson, Jr. et al. | |
| 6,474,717 B2 | 11/2002 | Viertel et al. | |
| 6,475,937 B1 | 11/2002 | Preisler et al. | |
| 6,494,521 B2 | 12/2002 | Hennessey | |
| 6,499,868 B1 | 12/2002 | Kerul | |
| 6,511,029 B2 | 1/2003 | Sawayanagi | |
| 6,547,308 B2 | 4/2003 | Hamelink et al. | |
| 6,604,772 B2 | 8/2003 | Sturt | |
| 6,604,773 B2 | 8/2003 | Aoki et al. | |
| 6,612,637 B1 | 9/2003 | Crotty | |
| 6,637,799 B1 | 10/2003 | Tiesler | |
| 6,659,528 B1 | 12/2003 | Wilson | |
| 6,669,859 B1 | 12/2003 | Tiesler | |
| 6,676,129 B2 | 1/2004 | Wilson | |
| 6,679,538 B1 | 1/2004 | Sturt | |
| 6,685,257 B1 | 2/2004 | Beland et al. | |
| 6,692,059 B1 | 2/2004 | Mills | |
| 6,692,060 B1 | 2/2004 | Wilson | |
| 6,698,814 B1 * | 3/2004 | Mills | B60J 3/0208 296/97.11 |
| 6,698,815 B1 | 3/2004 | Mills | |
| 6,707,674 B1 | 3/2004 | Bryant et al. | |
| 6,796,593 B2 | 9/2004 | Hennessey | |
| 6,799,795 B1 | 10/2004 | Zapinski | |
| 6,830,280 B2 | 12/2004 | Sturt et al. | |
| 6,840,561 B2 | 1/2005 | Mills et al. | |
| 6,860,546 B1 | 3/2005 | Fero et al. | |
| 6,863,332 B2 | 3/2005 | Yasuhara et al. | |
| 6,871,990 B2 | 3/2005 | Imazeki et al. | |
| 6,910,725 B1 | 6/2005 | Lanser et al. | |
| 6,921,121 B2 | 7/2005 | Schneider et al. | |
| 6,923,490 B2 | 8/2005 | Peterson et al. | |
| 6,948,736 B2 | 9/2005 | DePottey et al. | |
| 6,957,841 B1 | 10/2005 | Tiesler et al. | |
| 6,962,385 B2 | 11/2005 | Wieczorek et al. | |
| 7,000,972 B2 | 2/2006 | Asai | |
| 7,025,399 B1 | 4/2006 | Crotty, III | |
| 7,032,949 B1 | 4/2006 | Wang et al. | |
| 7,036,877 B2 | 5/2006 | Schultz et al. | |
| 7,036,965 B2 | 5/2006 | Dalton, Jr. et al. | |
| 7,055,884 B2 | 6/2006 | Zapinski et al. | |
| 7,059,652 B2 | 6/2006 | Aoki et al. | |
| 7,086,681 B2 | 8/2006 | Fernandez et al. | |
| 7,090,281 B2 | 8/2006 | Davey et al. | |
| 7,108,308 B2 | 9/2006 | Remy | |
| RE39,316 E | 10/2006 | Murdock et al. | |
| 7,201,427 B2 | 4/2007 | Wang et al. | |
| 7,213,865 B2 | 5/2007 | Torri | |
| 7,217,017 B2 | 5/2007 | Smith | |
| 7,281,751 B2 | 10/2007 | Hamelink et al. | |
| 7,311,427 B2 | 12/2007 | Barker et al. | |
| 7,320,493 B2 | 1/2008 | Kumakawa et al. | |
| 7,338,108 B2 | 3/2008 | Iwatsuka et al. | |
| 7,384,088 B2 | 6/2008 | Remy | |
| 7,416,239 B2 | 8/2008 | Lanser et al. | |
| 7,416,319 B2 | 8/2008 | Richard et al. | |
| 7,458,627 B2 | 12/2008 | Tiesler et al. | |
| 7,461,886 B1 | 12/2008 | Wang et al. | |
| 7,534,018 B2 | 5/2009 | Nicola | |
| 7,537,263 B2 | 5/2009 | Delphia | |
| 7,556,308 B2 | 7/2009 | Lee et al. | |
| 7,559,667 B2 | 7/2009 | Holderman | |
| 7,677,775 B2 | 3/2010 | Oehmann | |
| 7,703,832 B2 | 4/2010 | Shorter et al. | |
| 7,717,491 B2 | 5/2010 | Beck et al. | |
| 7,780,322 B2 | 8/2010 | Muller et al. | |
| 7,784,847 B2 | 8/2010 | Asai | |
| 7,798,551 B2 | 9/2010 | Okazaki et al. | |
| 7,771,062 B2 | 10/2010 | Kuhn | |
| 7,823,954 B2 | 11/2010 | Jones et al. | |
| 7,854,464 B2 | 12/2010 | Mori | |
| 7,862,220 B2 | 1/2011 | Cannon et al. | |
| 7,866,724 B2 | 1/2011 | Olep et al. | |
| 7,944,371 B2 | 5/2011 | Foote | |
| D643,951 S | 8/2011 | Cal | |
| 8,096,688 B2 | 1/2012 | Kino et al. | |
| 8,215,810 B2 | 7/2012 | Welch et al. | |
| 8,333,422 B2 | 12/2012 | Ogawa et al. | |
| 8,408,773 B2 | 4/2013 | Judge | |
| 8,425,094 B2 | 4/2013 | Stakoe | |
| 8,434,811 B2 | 5/2013 | Rockafellow et al. | |
| 8,596,803 B2 | 12/2013 | Schultz | |
| 8,606,355 B1 | 12/2013 | Bruhnke et al. | |
| 8,845,000 B2 | 9/2014 | Asai et al. | |
| 8,905,457 B2 | 12/2014 | Mertz | |
| 9,033,392 B2 | 5/2015 | Asai et al. | |
| 9,186,962 B2 | 11/2015 | Huff et al. | |
| 9,233,598 B1 | 1/2016 | Elwood | |
| 9,352,638 B2 | 5/2016 | Barna | |
| 9,434,241 B2 | 9/2016 | Asai et al. | |
| 9,481,230 B2 | 11/2016 | Marco Primo et al. | |
| 9,701,181 B2 | 7/2017 | Moekler et al. | |
| 9,834,068 B2 | 12/2017 | Cha et al. | |
| 9,975,407 B2 | 5/2018 | Still et al. | |
| 2001/0024048 A1 | 9/2001 | Hobson et al. | |
| 2001/0050493 A1 | 12/2001 | Welter | |
| 2004/0145209 A1 | 7/2004 | Peterson | |
| 2005/0034555 A1 | 2/2005 | Staker | |
| 2006/0061008 A1 | 3/2006 | Karner et al. | |
| 2006/0175861 A1 | 8/2006 | Ikeda et al. | |

(56) References Cited

U.S. PATENT DOCUMENTS

| | | |
|---|---|---|
| 2008/0093876 A1* | 4/2008 | Olep ............... B60J 3/0204 296/97.11 |
| 2008/0130305 A1 | 6/2008 | Wang et al. |
| 2009/0121513 A1 | 5/2009 | Olep |
| 2010/0013263 A1 | 1/2010 | Okazaki et al. |
| 2010/0096878 A1 | 4/2010 | Wieczorek et al. |
| 2010/0117395 A1 | 5/2010 | Wieczorek et al. |
| 2011/0227362 A1 | 9/2011 | Rockafellow et al. |
| 2011/0260492 A1 | 10/2011 | Ogawa et al. |
| 2013/0069388 A1 | 3/2013 | Huff |
| 2016/0167573 A1 | 6/2016 | Janowiak |
| 2017/0313163 A1 | 11/2017 | Watts et al. |
| 2017/0313164 A1 | 11/2017 | Lehman et al. |

FOREIGN PATENT DOCUMENTS

| | | |
|---|---|---|
| JP | 2010179794 | 8/2010 |
| JP | 201142238 | 3/2011 |
| JP | 2011042335 | 3/2011 |
| WO | WO2010045438 | 4/2010 |

* cited by examiner

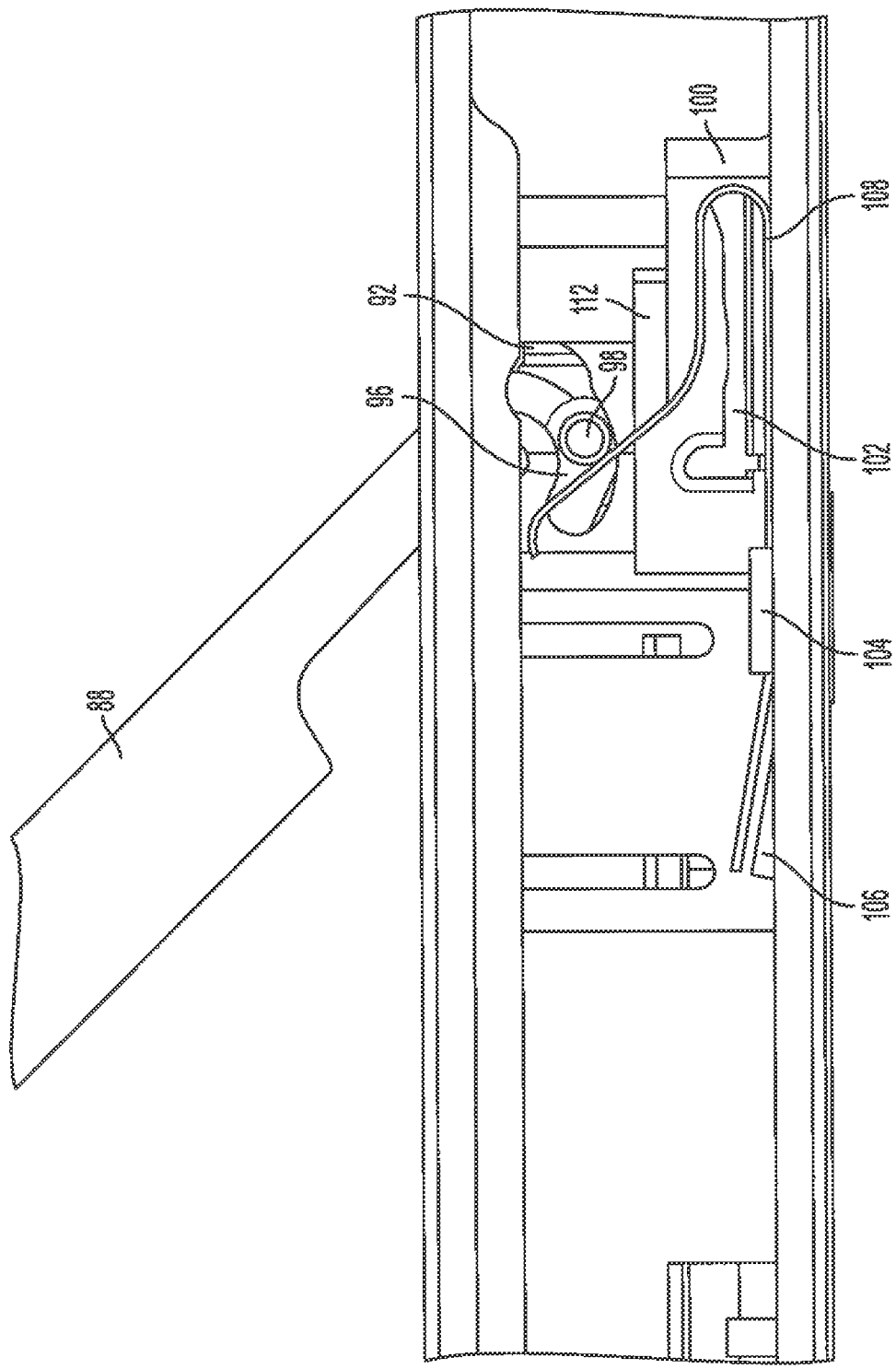

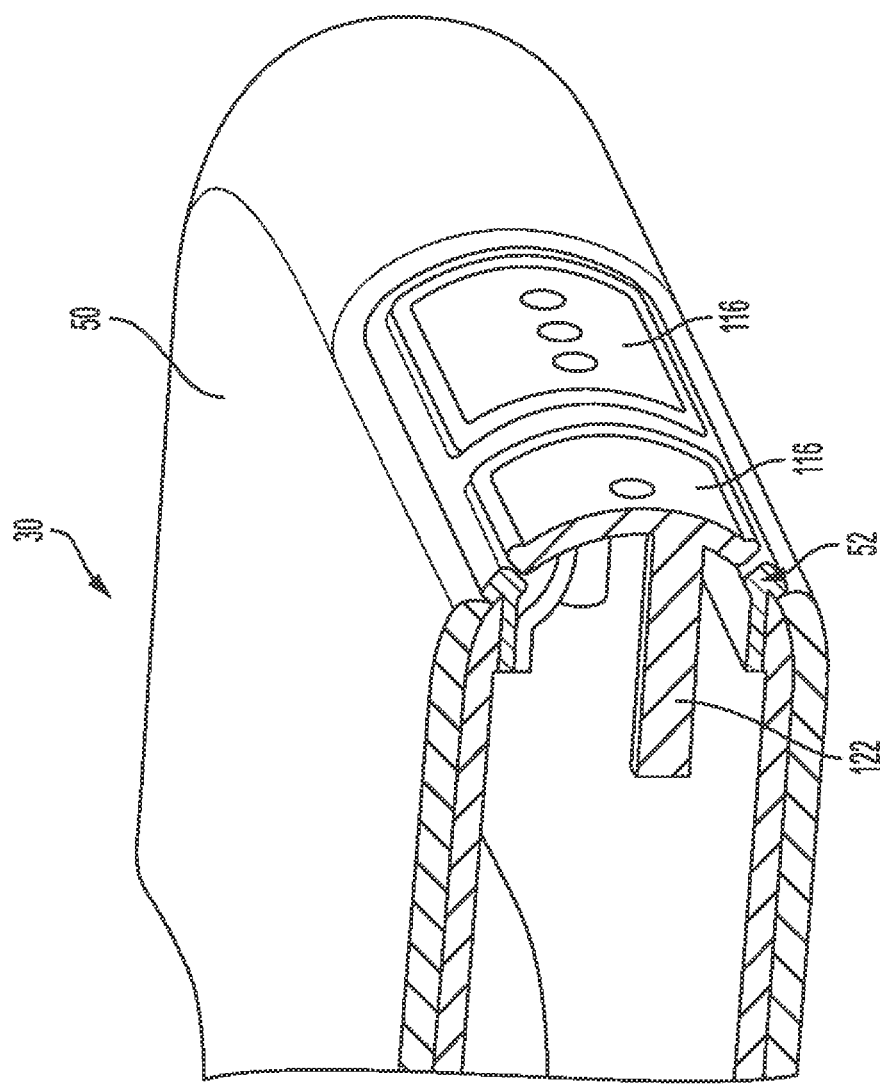

SLIDING THIN VISOR

BACKGROUND OF THE INVENTION

1. Field of the Invention

The present invention relates generally to a movable sun visor for interior use in a vehicle, and more particularly relates to a sun visor wherein the visor body includes two visor body halves or shells adapted to close about and slidably retain a carrier attached to a pivot rod.

2. Description of Related Art

Sun visors are well known and widely used in the prior art. Many different types of designs have been successfully employed in vehicles over the years. Many of these prior an visors have been developed in a variety of ways through which visor bodies and other interior components may be constructed and mounted within the vehicle. Advances in design can often add complexities to the manufacturing processes for interior components. There has been and continues to be a premium in the automotive industry on cost savings, and improvements in the efficiency and speed in the manufacturing processes for such components therein. One area of particular focus in the automobile technology field has been reducing the number and complexity of steps required to assemble interior components such as sun visors or visors for use in vehicles.

Generally in the prior art, manufacturing simplicity continues to drive innovations in the automotive industry, loss of quality and performance in the manufacturing of components for the sake of facilitating production is seldom, if ever, acceptable. There is a substantial body of prior art relating to the specific structure of the visor to provide a strong, light weight construction that matches or compliments the interior vehicle trim in a cost effective manner. Of particular interest has been the two shell type construction, which involves the molding of two separate shell pieces, which are then joined to form a visor body. In one typical shell design, the visor halves are formed as a single piece attached along the longitudinal edge and then folded to form the visor body. In another visor body shell design, the visor halves are formed separately and then attached to one another via welding or some other fastening technique. The exterior surface may be molded to provide a suitable visor surface, or a desired outer covering may be added in a variety of different ways known in the prior art. The two visor body halves or shell design allows the visor body to be constructed relatively quickly and easily, however the various components that are attached to the visor shell halves must in some eases be incorporated with several assembly steps prior to securing the shell halves together. For example, some of the known designs require insertion of additional mounting or journaling pieces for retention of the visor pivot rod within the visor body. The construction of the visors having such a design is relatively time intense. Moreover, the various slides, journals, retainers, etc., utilized in the construction may add significant expense and weight to the overall, visor, along with unwanted noise and increase the number of components necessary to build one.

In some cases, eliminating parts may reduce the expense of manufacturing and constructing a visor. The decrease in size and weight, however can be accompanied by a decrease in strength. Rotatable visors are a concern where flimsy construction of the visor core, body and slider components may be insufficient to withstand repeated torque actions on the visor shell itself, and in some cases cause dislodging or breaking of the components. Furthermore, the consumers of motor vehicles require visors that are nearly silent in operation and do not involve unwanted noises or sloppiness when pivoting, sliding or rotating the visors. Hence, it is thus desirable in the art to provide a visor that is lightweight, easy to manufacture and uses relatively few components, yet utilizes a design imparting significant durability to withstand heavy and repeated use and to provide a solid construction with tight tolerances throughout the entire system. Furthermore, there is a need in the art for an improved sliding thin visor that has a carrier that has an overall visor body thickness of approximately seventeen to eighteen millimeters. Also, there is a need in the art for a thin visor that may include a sliding mechanism, such that the visor may slide along a pivot rod and may have a mailbox shaped detent to help achieve tight tolerances during the rotation and sliding of the visor with respect to the pivot rod. There also is a need in the art for a sun visor that uses a thin visor concept that may have switches that power lights on and off for the visor vanity located in the headliner and are not arranged directly in the visor. There also is a need in the art for a sliding visor that may have a sliding vanity or a flip up vanity depending on the design requirements.

SUMMARY OF THE INVENTION

One object of the present invention may be that it provides an improved thin visor.

Another object of the present invention may be that it provides a thin visor that has a carrier slidingly arranged over a pivot rod.

Yet a further object of the present invention may be that it provides a thin visor that has a visor rotation switch that may allow lights within the vanity to turn on to illuminate a mirror therein when the visor door is rotated into an open position.

Still another object of the present invention may be that it provides a thin visor that includes a vanity switch that may turn on lights arranged in a headliner of the vehicle to illuminate the mirror and person looking in to a mirror in the vanity.

Still another object of the present invention may be that it provides a thin visor that provides a flush or side mounted universal door opener mechanism arranged on a surface of the visor body.

Still another object of the present invention may be that it provides for a thin visor that includes an improved detent design arranged within the carrier in order to secure the sun visor body to the pivot rod.

Still another object of the present invention may be that it provides for a thin visor having a sliding vanity door that allows for a sliding door to cover a vanity mirror arranged within a body of the thin visor.

According to the present invention, the foregoing and other objects and advantages are obtained by a novel design for a thin visor for use in a vehicle. The sliding thin visor generally comprises a pivot rod and a first and second shell being engageable to form a visor body. The visor also comprises a rail extending from a surface of the first shell and a carrier slidably positioned in the visor body and engaged with the rail of the first shell. The visor further comprises a detent assembly having a generally mailbox shape attached to the carrier and in contact with the pivot rod. The visor body generally may have a thin design with a thickness of approximately between seventeen to eighteen millimeters.

One advantage of the present invention may be that it provides an improved thin visor.

Still another advantage of the present invention may be that it provides an improved thin visor having a carrier slidingly arranged over a pivot rod.

Still another advantage of the present invention may be that it provides a thin visor having a visor rotation switch therein along with lights arranged in a headliner of the vehicle in order to provide light for a vanity mirror arranged within the visor body.

Still another advantage of the present invention may be that it provides for a thin visor that includes a vanity switch that provides light to the mirror when the vanity door is pivoted into an open position.

Still another advantage of the present invention may be that it provides a thin visor that uses a flush or side mounted universal door opener mechanism in order to control lights, garage doors and other household components.

Yet another advantage of the present invention may be that it provides a thin visor having an improved detent that has the general shape of a mailbox.

Still another advantage of the present invention may be that it provides a thin visor that incorporates a sliding vanity door into the visor body to allow for covering and uncovering of a vanity mirror arranged therein.

Other objects, features and advantages of the present invention will become apparent from the subsequent description and appended claims, taken in conjunction with the accompanying drawings.

BRIEF DESCRIPTION OF THE DRAWINGS

FIG. 13 shows a side view of a vanity switch with the door in an open position according to the present invention.

FIG. 20 shows a cross sectional view of a side mounted universal opener assembly according to the present invention.

BRIEF DESCRIPTION OF THE EMBODIMENT(S)

Figure 1:
FIG. 1 shows plan view of a thin visor according to the present invention.
Figure 2:
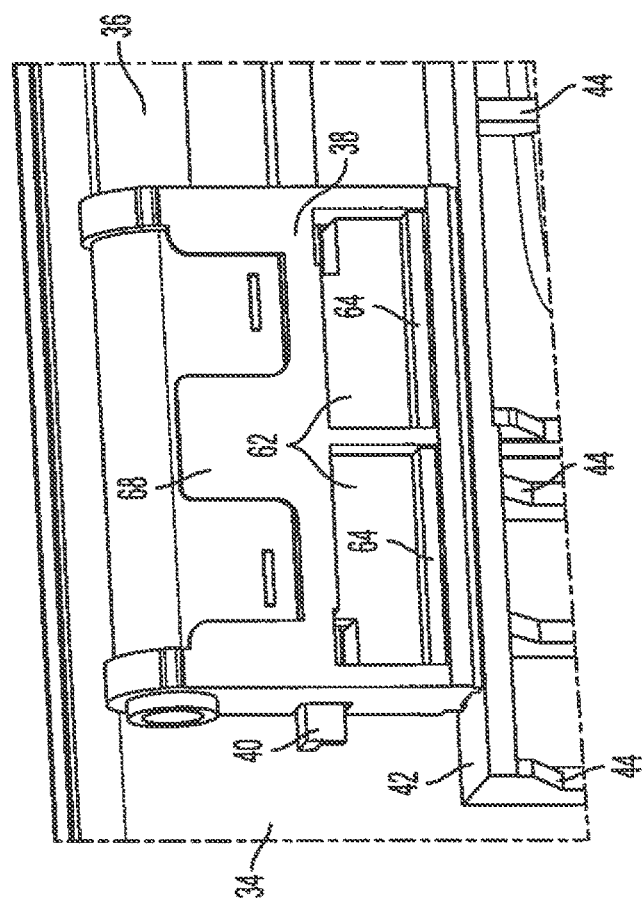
FIG. 2 shows a close up view of a carrier in use with the thin visor according to the present invention.
Figure 3:
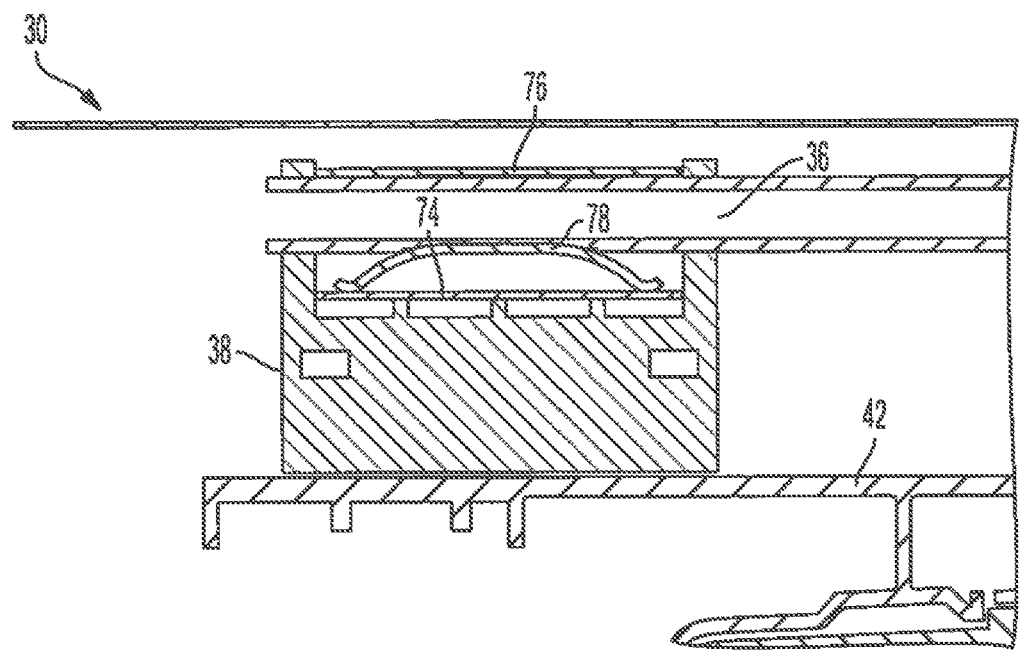
FIG. 3 shows a cross sectional view taken along line 3-3 of FIG. 1 according to the present invention.
Figure 4:
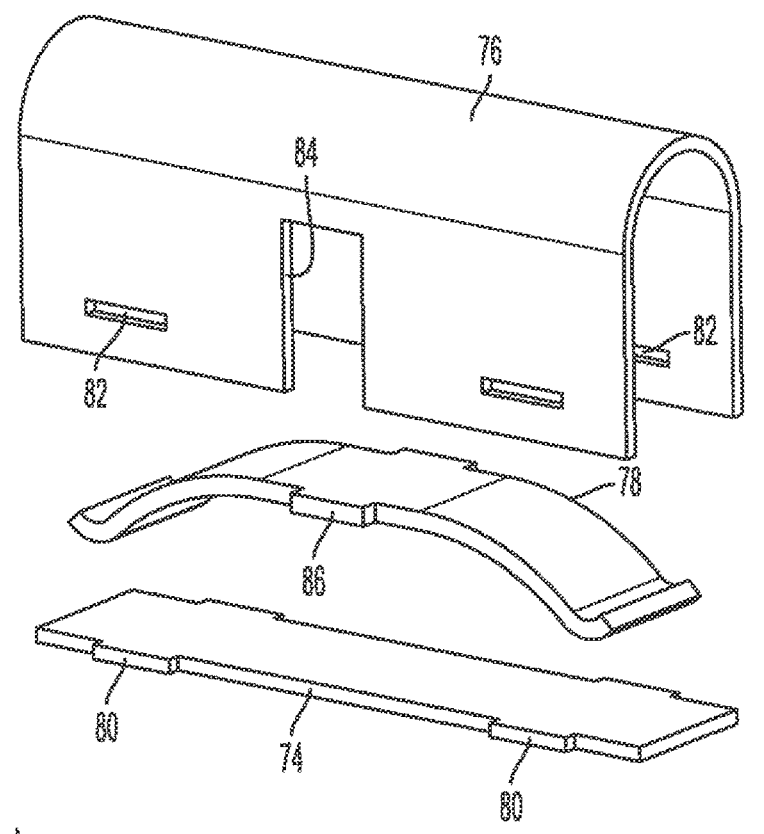
FIG. 4 shows an exploded view of a detent used in the thin visor according to the present invention.
Figure 5:
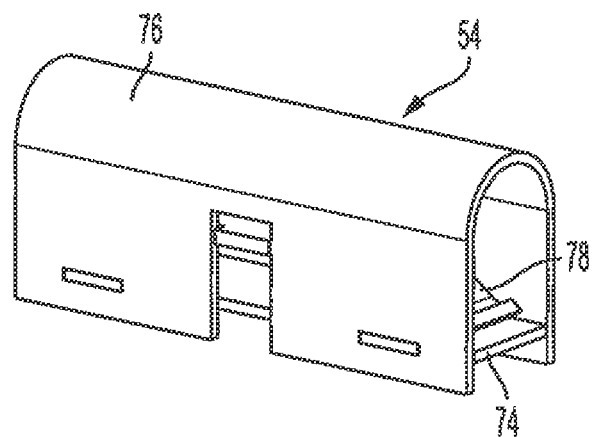
FIG. 5 shows a perspective view of a detent used in the thin visor according to the present invention.
Figure 6:
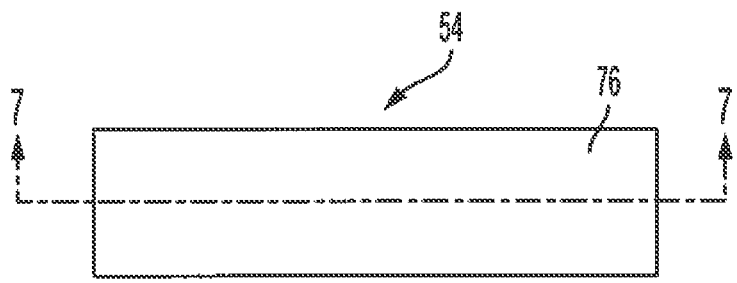
FIG. 6 shows a top view of a detent used in the thin visor according to the present invention.
Figure 7:
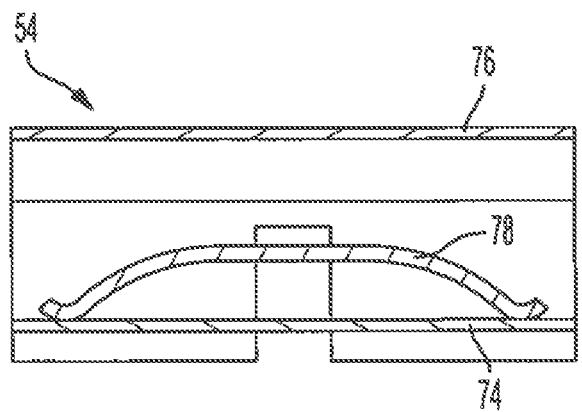
FIG. 7 shows a cross sectional view taken along line 7-7 of FIG. 6 according to the present invention.
Figure 8:
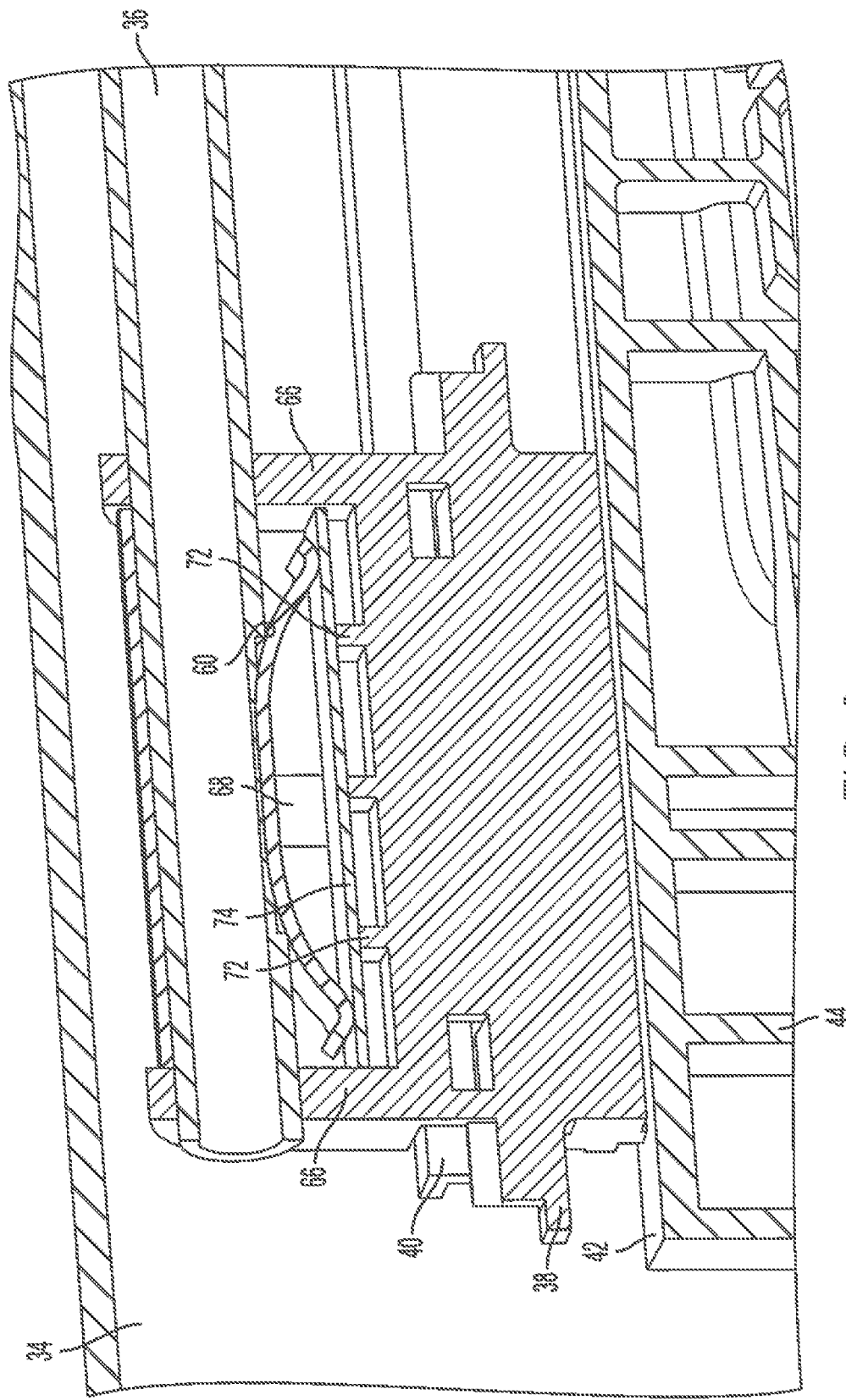
FIG. 8 shows a partial cross section of a thin visor according to the present invention.
Figure 9:
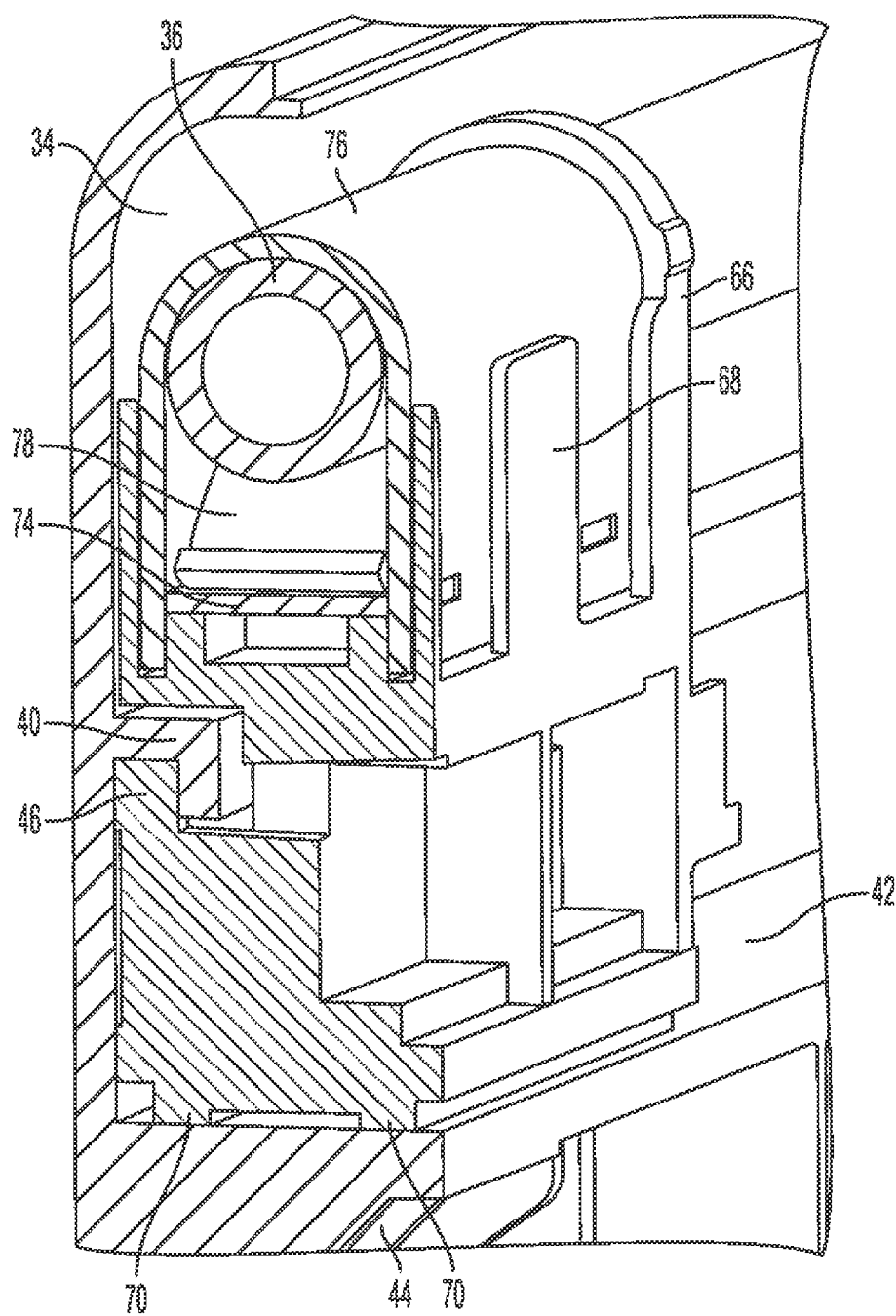
FIG. 9 shows a partial cross section of a thin visor according to the present invention.
Figure 10:
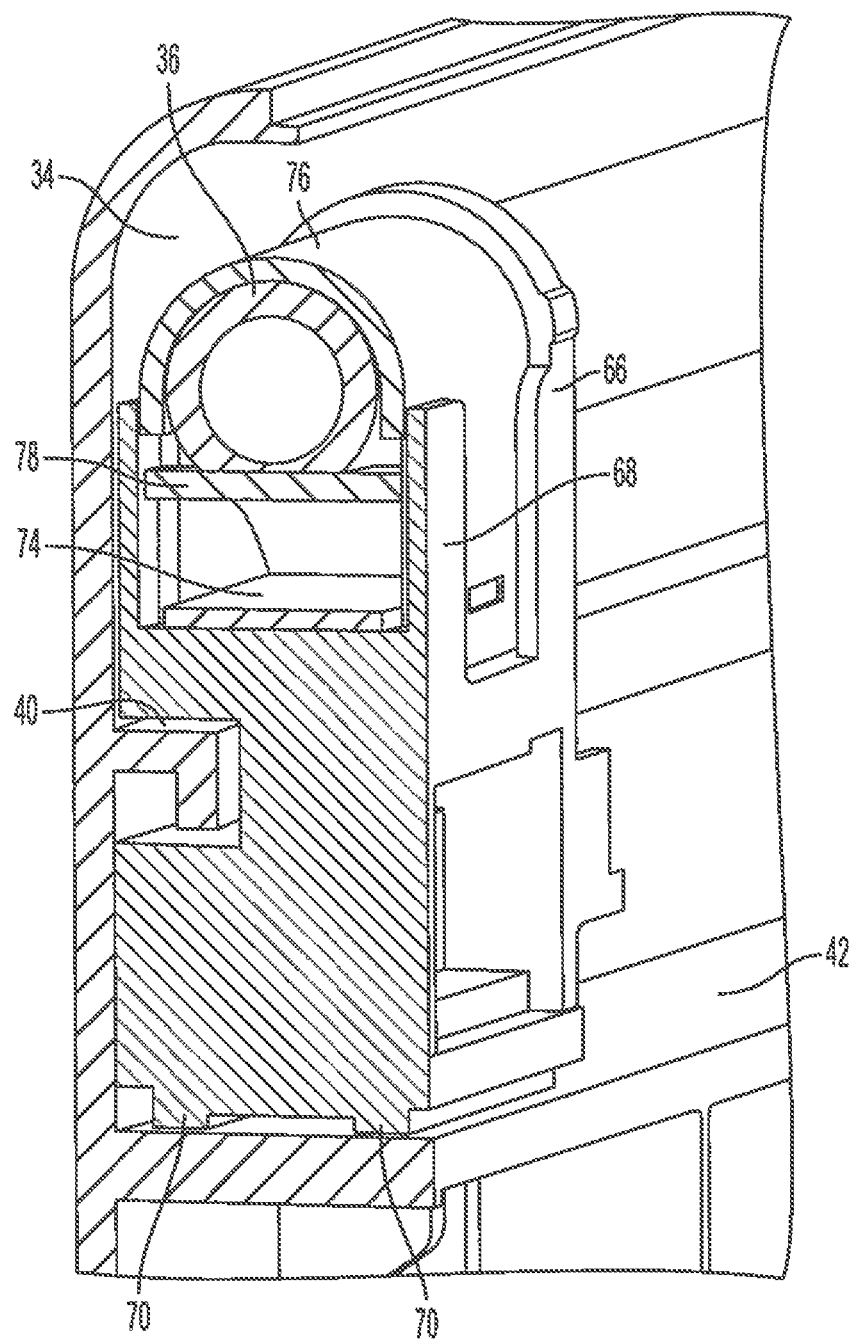
FIG. 10 shows a partial cross sectional view of a thin visor according to the present invention.
Figure 12:
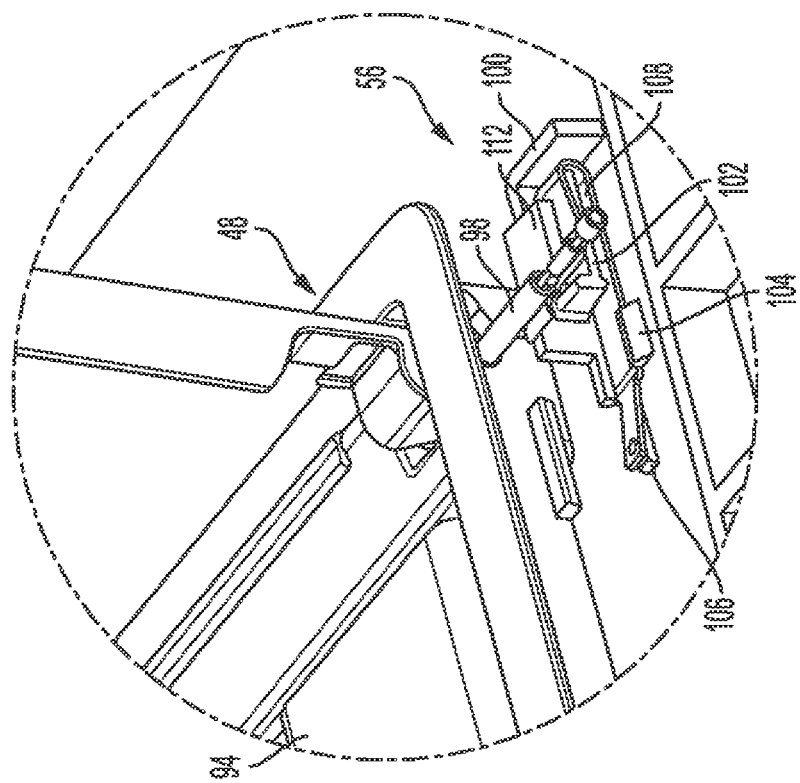
FIG. 12 shows a view of a vanity switch with the vanity door in an open position according to the present invention.
Figure 11:
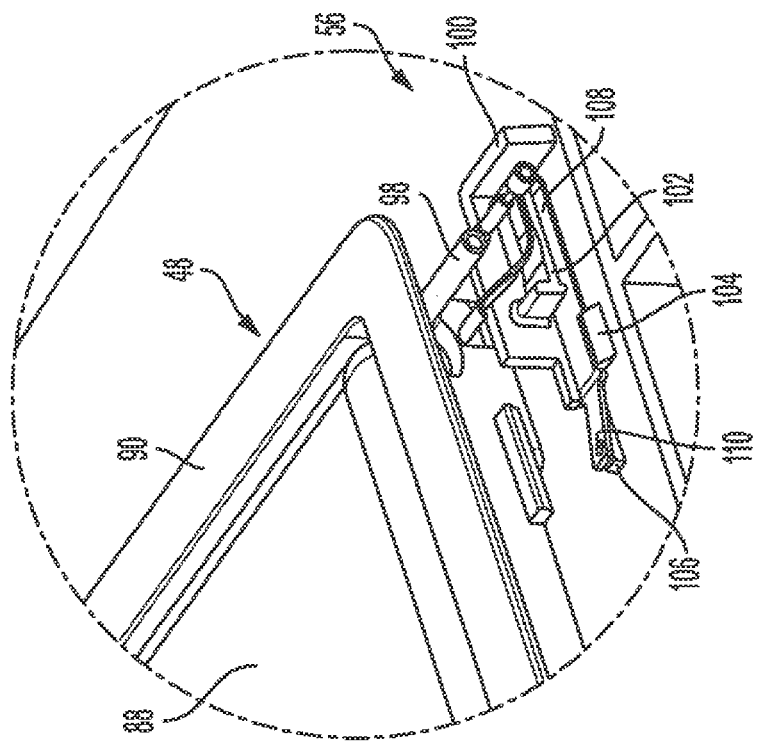
FIG. 11 shows a vanity switch for use in a thin visor according to the present invention.
Figure 14:
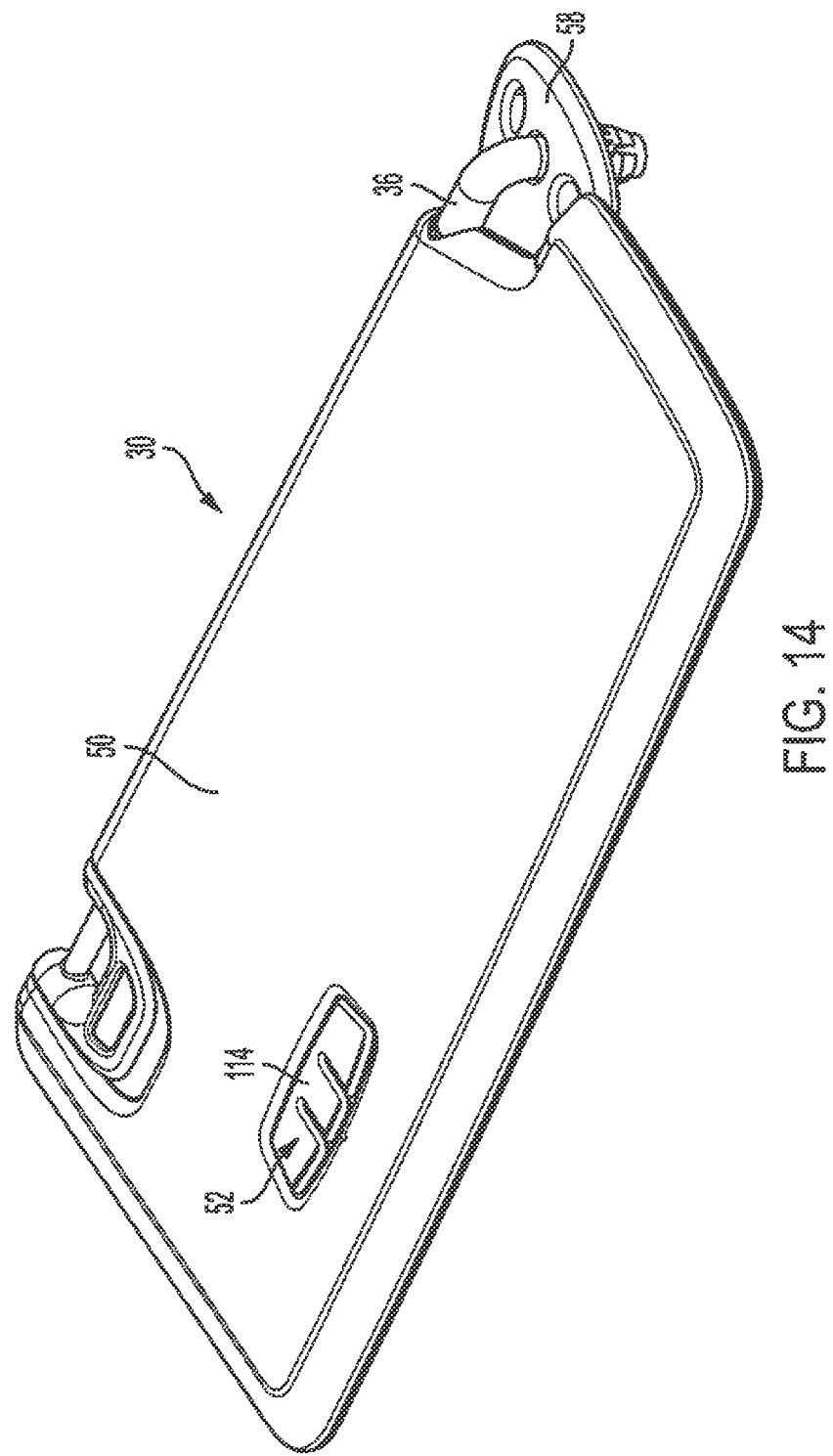
FIG. 14 shows a plan view of a thin visor according to present invention.
Figure 15:
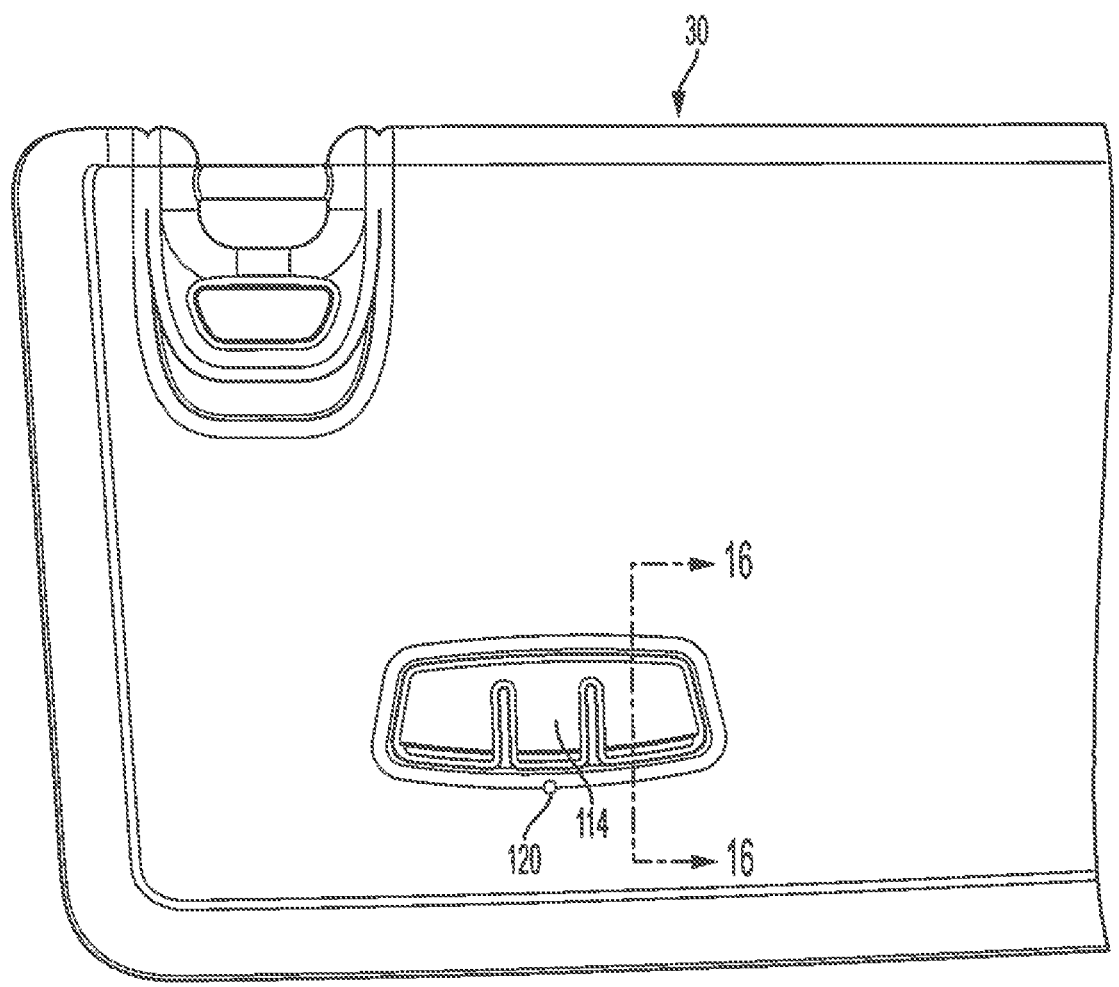
FIG. 15 shows a partial front perspective of a thin visor according to the present invention.
Figure 16:
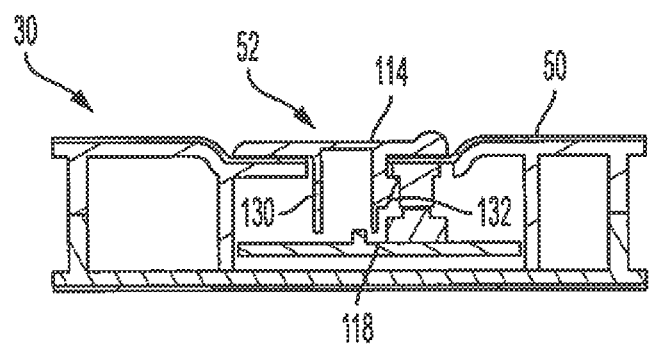
FIG. 16 shows a cross sectional view taken along line 16-16 of FIG. 15 according to the present invention.
Figure 17:
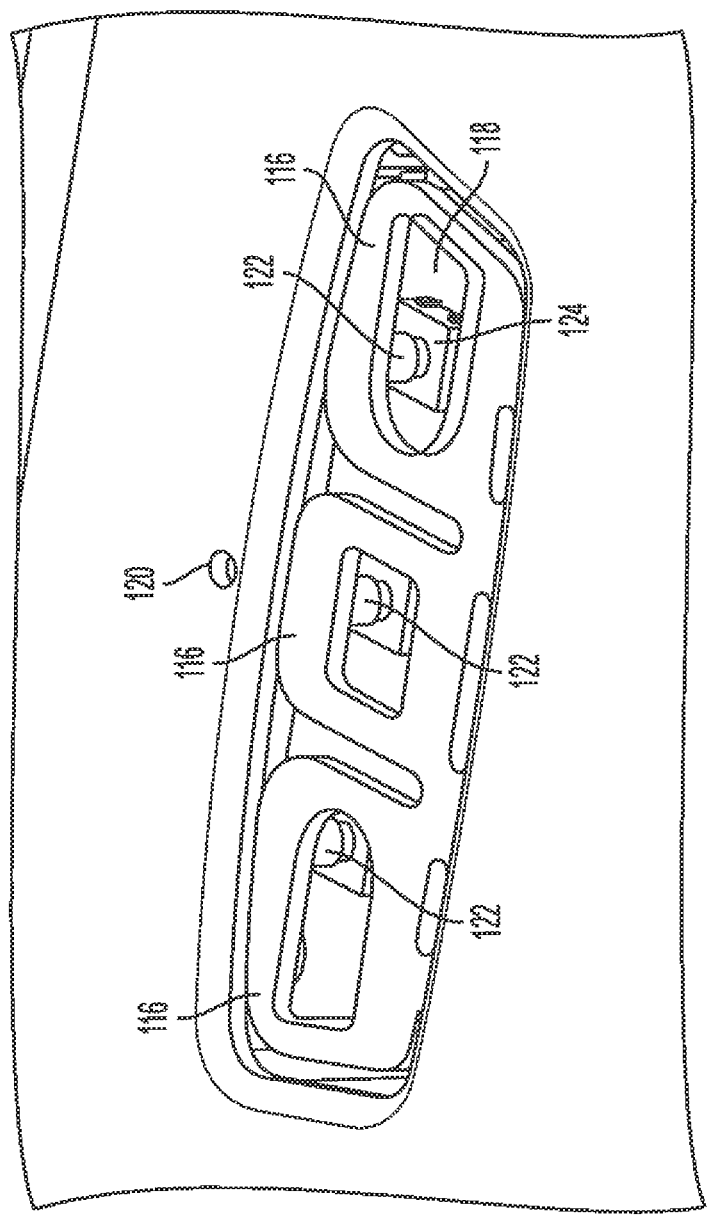
FIG. 17 shows a perspective view of a flush mounted universal opener assembly according to the present invention.
Figure 18:
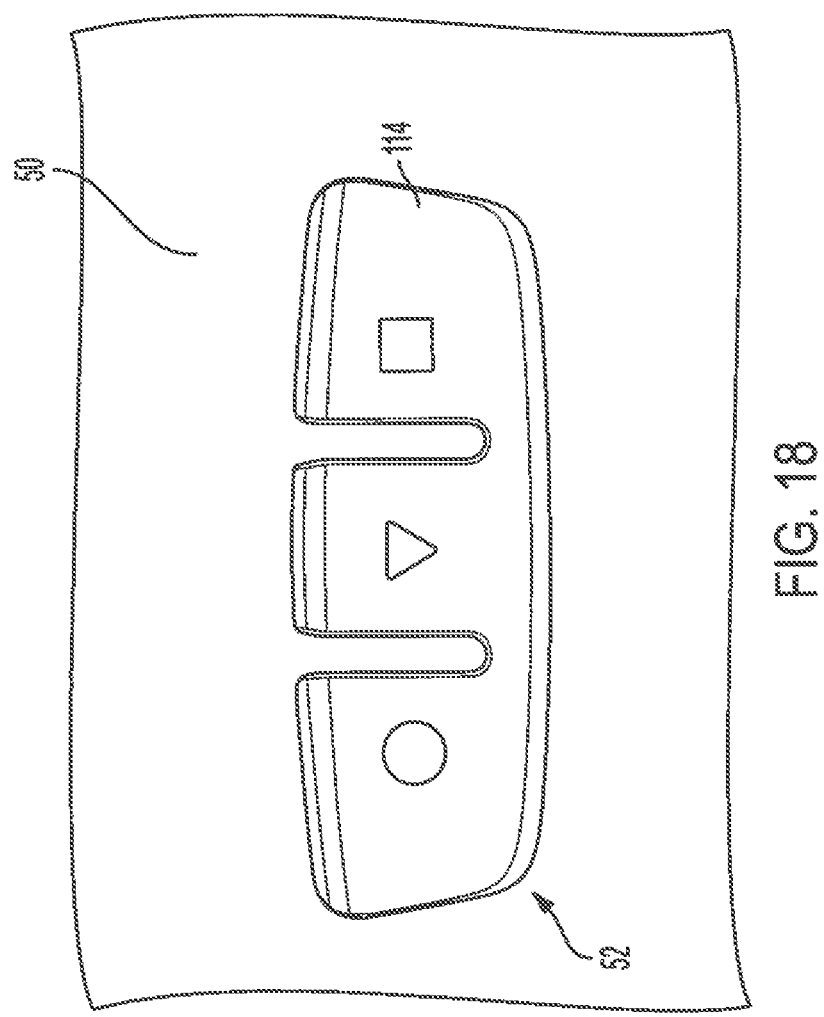
FIG. 18 shows a top view of a flush mounted universal opener assembly according to the present invention.
Figure 19:
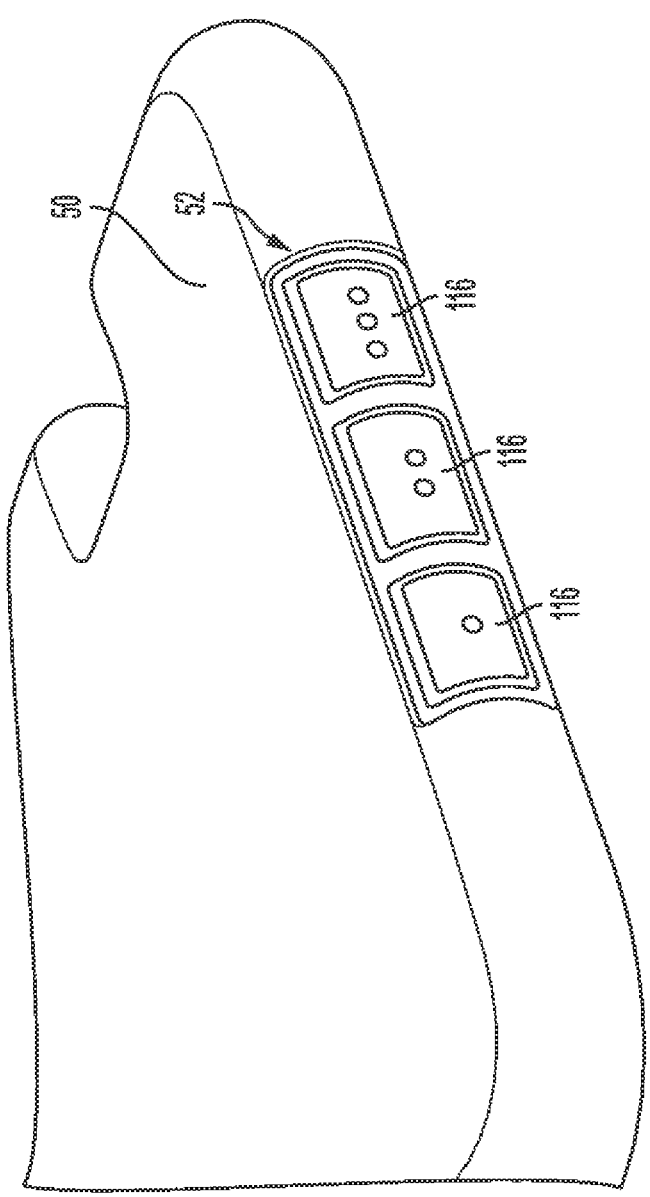
FIG. 19 shows a perspective view of a side mounted universal opener assembly arranged in a thin visor according to the present invention.

Referring to the drawings, there is shown a thin visor, sun visor or visor 30 according to an embodiment of the present invention. The visor 30 may be a sliding visor or a non-sliding visor. The visor 30 may be a thin visor, a standard size version or any other type or size of visor. Generally, the present invention broadly provides a dual shell or halves 32, 34, which form a visor body. The vehicle sun visor 30 has a pivot rod 36 mounted to a carrier 38, wherein the pivot rod 36 and carrier 38 are slidably captured within the visor shell portions 32,34 when they are secured together. The carrier 38 thus rides in the visor body itself and in one embodiment is preferably retained via a rail 40 to one of the visor half shells 32,34 within the visor body. It should be noted that the retention may also include other surfaces and/or features such as channels, shelves and the like which may be molded integrally with the shell portions 32,34. Similarly, the pivot rod 36 rides in the visor body via bracket 58, bezels or similar components to support the pivot rod 36 therein. These components may be molded directly in to the visor half shells 32,34. Other aspects of the present invention include methods for manufacturing a sun visor 30 also described herein. Furthermore, it should be noted that the visor 30, as shown in the present application, may be used in any known type of vehicle, such as but not limited to automotive vehicles, maritime vehicles, aerospace vehicles, military vehicles, and any other known vehicle that may have a need for the sun to be blocked from filtering into the interior compartment of the vehicle. It should also be noted that generally all of the components of the sliding thin visor 30, according to the present invention, may be made of a plastic material that is capable of either being extruded, molded, or shaped by any known manufacturing process. However, any other known metal, ceramic, plastic, composite, natural material or any other known material may also be used for any of the parts or components of the sliding thin visor 30 described herein.

In one embodiment shown in the figures, the sliding thin visor 30 includes a first and second halves or shells 32,34 that are engagable to form the elongate visor body. Various molded features may be included on each shell to facilitate engagement of the shells 32,34. For example, complimentary structures may be formed on the respective visor shells that allow a snap fit therebetween. In one contemplated embodiment, the shells 32,34 may be formed having the two visor shells 32,34 made of separate substrate halves and then combined together and closed with respect to one another and vibration welded together to form the visor body as shown in the drawings. However, it should be noted that other contemplated embodiments may have the shells 32,34 be formed by having an integral or connected longitudinal peripheral edges respectively. This would allow for the edges to fold around the connected longitudinal peripheral edge to complete a clam shell visor in one embodiment. Other embodiments are contemplated in which the shells 32,34 are formed as separate, unconnected members and are connected using different fastening techniques other than vibration welding, such as but not limited to locks, fasteners, chemical fasteners, mechanical fasteners, or any other type of connecting methodology for mating two objects to one another. Although separate and unconnected shells 32,34 are preferred, connected shells may also be used depending on the design requirements. The visor 30 further includes a pivot rod 36 that is arranged into one end of the visor body and connected on the opposite end to a headliner or roof of the vehicle to which the sun visor 30 is arranged. The sliding thin visor 30 is preferably formed such that the shells 32,34 may be closed about the pivot rod 36 and as such capture the pivot rod 36 therebetween. Also, the sliding thin visor 30 may include a carrier 38 which is slidably captured within one or between both of the shells 32,34 via a rail mechanism 40 arranged from an inside surface of one shell or via any other methodology. All of the component parts of the sliding thin visor 30 may be manufactured from known materials and by known processes, such as but not limited to any type of plastic, metal, ceramic, composite, natural materials or any other known material and by any type of molding technique, forming technique, chemical or mechanical process that may be used to design and make the components as described herein.

Generally, the shells 32,34 are formed by injection molding of plastic material in a conventional manner. For example, the shells 32,34 may be formed from a molded polyethylene or by some other suitable method and/or material. The first and second shells 32,34 generally include retaining surfaces in any known shape, such as arcuate retaining surfaces, flat or angle retaining surfaces, all of which may be elongate, or trough shaped surfaces extending parallel to an edge of the visor shells 32,34 and defining a portion of a visor wall. It should further be appreciated that the present invention may encompass designs with retaining surfaces that vary in dimension between longer, trough shaped features and more narrow arcuate ledges as shown in the figures. It should further be noted that one of the shells 32,34 may have a rail 40 extending from a predetermined inside surface thereof and extending in a longitudinal direction. It should be noted that the rail 40 may extend a predetermined distance along the inside surface of one of the visor half shells 32,34. In one contemplated embodiment, the rail 40 may generally have an L-shape when viewed in cross section and extend from the inside surface of one of the shells 32,34. One of the visor shells 32,34 may also include a shelf 42 that extends out from an interior wall thereof, wherein the shelf 42 extends a predetermined longitudinal distance across a predetermined portion of the inside surface of one of the visor half shells 32,34. The shelf 42 generally may have a rectangular top surface that extends perpendicular from the inside surface of the visor half shell 34 and may include a plurality of different sized and shaped bracket 58 is arranged between a bottom surface of the shelf 42 and the inside surface of the visor half shell 34. It should be noted that in one contemplated embodiment, the carrier 38 described herein may have a bottom surface slide along the top surface of the shelf 42 and have the L-shaped rail 40 interengage with a flange or riding surface 46 arranged along a generally mid point of the carrier 38. The rail 40 and the shelf 42 of the first shell 34 of the visor body 30 are generally parallel to one another with the rail 40 being arranged above or towards the top of the visor half shell 34 with respect to the shelf 42. It should further be noted that the visor half shells 32,34 may include other surfaces that receive and hold various components of the sliding thin visor 30, such as but not limited to the pivot rod 36, a D-ring, a vanity 48, cover material 50 arranged over the visor body 30, visor rotation switches, a vanity switch 56, flush or side mounted universal openers 52, a detest assembly 54 and a sliding vanity door. The visor half shells 32,34 may also include any other known plurality of orifices or other surfaces, journals or bracket 58 s extending from either an inside surface, side surface or outside surface depending on the design requirements of the sliding thin visor 30.

The sliding thin visor 30 also includes a pivot rod 36 which is attached at one end to a bracket 58 and connector 58, which is secured to a headliner or roof of a vehicle. The bracket 58 may have a connector secured thereto to connect the electrical system of the vehicle via a wire or other mechanism to the bracket 58. The wire may then be passed through the pivot rod 36 or traversed in another manner into the visor body. However, it should be noted that a solid pivot rod 36 may be used and may or may not be capable of passing electricity therethrough to allow for illumination of a vanity mirror that may be arranged in the visor body. Generally, the visor rod 36 may be hollow which may allow for a wire to pass therethrough and then provide power to a vanity 48 arranged within the visor body 30. The bracket 58 may be secured to the roof via fasteners or any other known methodology. The bracket 58 may include an orifice that may receive one end of the pivot rod 36 near an elbow of the pivot rod 36, wherein the pivot rod 36 generally has an angle of 60 to 120 degrees at the elbow. The pivot rod 36 may be secured and capable of rotation within the orifice of the bracket 58 and may also be swung between a front windshield of the vehicle and a side window of the vehicle to block the sun from any angle. The pivot rod 36 may be of any known length and diameter depending on the design of the visor 30 and the automobile into which it is arranged. The wire is connected from the electrical system of the automobile and is passed through to an LED or other lighting mechanism for illumination of a visor mirror in the vanity 48. It should be noted that the visor 30, pivot rod 36 and bracket 58 may be made of any known material such as but not limited to plastic, ceramic, composites, metals, natural materials, etc. The visor rod 36 may also include a predetermined notch 60 arranged near one end thereof, wherein that notch 60 generally has the form of a rectangular cutout arranged on a predetermined surface of the visor rod 36. It is also contemplated to use a visor pivot rod 36 that does not have a notch 60 surface arranged thereon.

The visor pivot rod 36 is arranged within a carrier 38, which is positioned on the shelf 42 and interengaged with the rail 40 of one of the visor half shells 32,34 according to the present invention. The carrier 38 also includes a first and second cavity 62 arranged on one side thereof, wherein the cavities 62 generally have a rectangular shape and may include a ledge 64 arranged therein. The carrier 38 generally has a rectangular shape, however any other shape may also be used. A first and second arm 66 may extend from a top thereof and at both corners thereof. The arms 66 generally have a circular orifice near a top thereof. The orifices receive the pivot rod 36 therethrough. A wall or panel 68 is arranged between the arms 66 and generally has a square or rectangular shape. The wall 68 is arranged on each side and from a top of the carrier 38. The carrier 38 also may include a first and second leg 70 extending from a bottom surface thereof, wherein the first and second leg 70 are parallel to one another and generally are rectangular in shape and extend the entire length of the carrier 38. It should be noted that the legs 70 extend a predetermined distance from the bottom of the carrier 38. The carrier 38 may also include a generally square shaped riding surface or flange 46 arranged at a general mid point thereof in a side of the carrier 38 opposite that of the first and second cavity 62. The flange 46 generally has a square shape when looked in cross section and generally may mimic the shape of a cavity 62 or gap formed by the rail 40, which is arranged from an inner surface of one of the visor half shells 32,34. Hence, the flange 46 may ride within the gap formed by the rail 40, thus slidingly securing the carrier 38 to the visor half shell 34 via the rail 40. Furthermore, the first and second leg 70 extending from the bottom surface of the carrier 38 may interengage with a top surface of the shelf 42 arranged from an inner surface of one of the visor half shells 32,34 thus allowing for engagement of the carrier 38 to the visor half shell 34 via the first and second leg 70 and the flange 46 interengaging with the rail 40 of the visor half shell 34. This may ensure that the carrier 38 is secured to the visor half shell 34 in a sliding manner, which allows for the visor carrier 38 to slide along the rail 40 a predetermined longitudinal distance prescribed by the length of the pivot rod 36, rail 40 and shelf 42 arranged therein. It should further be noted that the top portion of the carrier 38 includes a pocket that is generally defined by the first and second arm 70 and the walls 68 arranged from each side of the carrier 38. Extending in an upward direction from an inside surface of the pocket may be a plurality of ribs 72 which may be used to support a bottom plate 74 of a detent 54 which is arranged therein. It should be noted that the first and second cavity 62 arranged on one side of the carrier 38 may or may not include art orifice that passes through the carrier 38 until it reaches or goes through the flange 46 arranged on the opposite side of the carrier 38. The plurality of ribs 72 that extend from a bottom surface of the pocket of the carrier 38 may engage with a bottom plate 74 of the detent 54 as described above.

The detent assembly 54 generally includes a housing 76 having a generally U-shaped trough design, i.e., that of a mailbox, a spring 78 having a generally recurve bow shape arranged within the housing 76 of the detent 54 and a bottom plate 74 secured to or near a bottom of the housing 76 of the detent 54 in order to allow for the spring 78 to be arranged therein. Generally, the bottom plate 74 has a rectangular shape with a plurality of tabs 80 extending therefrom. In one embodiment shown, four tabs 80 extend from the bottom plate 74 from a side edge thereof. One tab 80 arranged near one end of the bottom plate 74 and a second tab 80 arranged near a second end of the bottom plate 74 and corresponding tabs 80 extending from the opposite side directly across from the first and second tabs 80. Hence, two tabs 80 extend from each side of the bottom plate 74. Generally, these tabs 80 have a rectangular shape, however any other known shaped tab may also be used. The housing 76 having a generally U-shape or mailbox shape may include at least one slot 82 and preferably four slots 82. The slots 82 may be arranged near each bottom end on each side of the housing 76 wherein those slots 82 may mimic the location of and may interact with and receive the tabs 80 on the bottom plate 74 to allow for the bottom plate 74 to be secured to the housing 76 of the detent 54. In one contemplated embodiment, the slots 82 generally have a rectangular shape which may mimic that of the rectangular tabs 80 extending from the side surfaces of the bottom plate 74. It should be noted that the location and shape/size of the tabs 80 and slots 82 in the bottom plate 74 and housing 76 respectively, may be anywhere along the housing 76 or bottom plate 74 depending on the design requirements of the visor 30. It should be noted that the housing 76 has two open ends such that the housing 76 generally forms a saddle shape and also includes a first notch 84 arranged on a first side thereof and a second notch 84 arranged on a second side thereof, wherein the notches 84 generally have a rectangular shape and extend from a bottom edge of the housing 76 a predetermined distance up into the side wall of the housing 76. This distance may be adjusted depending on the design requirements and the spring 78 used in the detent 54 assembly. The spring 78 generally as described above has a recurve bow shape and may also include a first tab 86 extending from a near mid point or mid point thereof on a first side thereof and a second tab 86 extending from a near mid point or midpoint on a second side thereof. This first and second tab 86 extending from the spring 78 may allow for the first and second tab 86 to be aligned with and slide within the first and second notch 84 arranged within the housing 76 of the detent 54 assembly. This may allow for the spring 78 to flex in a downward or upward motion with the downward motion being towards the bottom plate 74 when the spring 78 engages certain surfaces of the pivot rod 36. The detent 54 may have the pivot rod 36 pass through the top curved portion of the housing 76 and engage a top surface of the spring 78 when the carrier 38 and detent 54 assembly is arranged within the visor half shell 34 and the pivot rod 36 is arranged therethrough. The detent 54 assembly may be used to secure the pivot rod 36 to the visor body 30 via the spring 78 engaging with an upward force against an outer surface of the pivot rod 36 such that the pivot rod 36 may be pinched between an inner surface of the housing 76 and/or arms 66 and a top surface of the spring 78 thus allowing for a secure connection between the pivot rod 36 and the visor body 30. It should be noted that it is also contemplated that the visor pivot rod 36 may have a predetermined flat cutout portion 60 which may be arranged at or near an end of the visor pivot rod 36. This cutout portion 60 may allow for the detent assembly spring 78 to interact with the flat cutout portion in order to stop the visor body from sliding with respect to the pivot rod 36 when it reaches this flat surface 60, thus creating a hard stop to ensure that the visor body 30 does not slide off of the pivot rod 36 during use by the consumer in the vehicle. It should be noted that the shape of the spring 78 may allow for the efforts and force necessary to slide and rotate the visor body with respect to the pivot rod 36. It should further be noted that in one contemplated embodiment, all of the parts of the detent 54 assembly are made of a metal material, however any other plastic, ceramic, composite, or natural material may also be used for the detent 54 assembly components. It should also be noted that any other shape may also be used for the spring 78.

In one contemplated embodiment of the sliding thin visor 30, a wire routing option may be arranged therein and may have a wire routing system used in conjunction therewith. The sliding thin visor 30 may also include a vanity member 48. The vanity member 48 generally may include a vanity door 88, door springs 92, a vanity frame 90, a vanity mirror 94 with optional lights arranged therein or nearby. If the vanity 48 is illuminated, the vanity 48 may also include at least one lens to disburse light in a predetermined manner or a light guide/specialized mirror to perform such light dispersion. The vanity frame 90 may include at least one connecting flange. The vanity 48 may include a plurality of fasteners or tabs or locking surfaces extending therefrom which may be used to interact with reciprocal locking surfaces, shoulders, or other components arranged in one of the visor half shells 32,34, such that the vanity 48 is arranged and secured within a predetermined orifice through one of the visor body half shells 32,34. It should be noted that any known means for securing the vanity 48 within one of the visor half shells 32,34 may be used. If the vanity 48 does have illumination options, the vanity 48 may include a vanity door 88, which generally is pivotally connected to the vanity frame 90 via an arm, door springs or the like. The door 88 may be capable of rotating or pivoting between a closed position, wherein the vanity door 88 is flat compared to an outside surface of the visor body 30 and an open position wherein the vanity door 88 is not in a flat position with respect to the visor body such that the door 88 moves in a rotational manner such that the vanity mirror 44 is fully viewable by the user of the vanity 48. The vanity door 88 may include a first and second door arm or journal 96 extending from a top surface thereof, wherein that door arm 96 generally may have a C-shape or any other shape when viewed from the side. However, it should be noted that the C-shaped arm 96 may only extend from one end or near the middle of the vanity door 88, depending on the design requirements. Generally, the vanity door 88 may have a post or rod extending from a predetermined position. The post or rod are rotatably secured within the vanity frame 90 and allows for the vanity door 88 to rotate with respect to the vanity frame 90, thus allowing for the vanity mirror 94 to become visible when the door 88 is in an open position to the user of the vanity. A first contact extends at a right angle from the C-shaped journal 96. It should be noted that any known shape may be used for the journal 96 on the end of the vanity door 88. The first contact 98 is an electrical contact that is arranged within either an orifice of the generally C-shaped journal 96 of the vanity door 88, or arranged over a post or rod which extends from the journal 98 in an outward direction with respect to an edge of the vanity door 88. Generally, the first contact 98 which is an electrical contact or post may extend in a perpendicular direction from a side surface of the journal or C-shaped arm 96 of the vanity door 88. The first contact generally may be made of a metal material and may allow for electricity to flow between the electrical system or power system of the vehicle and a vanity light or LED arranged somewhere within the vanity 48 in order to illuminate the mirror 94 or another component/object. One of the visor half shells 32,34 may have a plurality of flanges extending from an inside surface thereof, wherein one of the flanges generally is a first L-shape flange 100 that extends from an inside surface of one of the shells 32,34. Extending from a side surface of the first L-shaped flange 100 may be a second L or T shaped flange 102, wherein the second L-shaped flange 102 is generally parallel with respect to an inside surface of the visor half shell 32,34. A first wedge shaped or triangular shaped flange 104 also extends from the inside surface of the visor half shell 32,34. A second triangular shaped or wedge shaped flange 106 also extends from an inside surface of the visor half shell 32,34. The first wedge shaped flange 104 is arranged adjacent to a portion of the first L-shaped flange 100 extending from the inside surface of the visor half shell 32,34, such that a predetermined gap or channel is arranged between the first L-shaped flange 100 and the first wedge flange 104. The second wedge flange 106 is arranged at or near a mid point between the first L-shaped flange 100 and first wedge flange 104 at a predetermined distance therefrom. This may allow for a second contact 108 to be arranged and secured within the channel formed by the first wedge flange 104 and a portion of the first L-shaped flange 100. An end of the second contact 108 may to be arranged on a top surface of the second wedge flange 106 in order to provide the necessary electrical connection between the vehicle and the second electrical contact 108. Generally, the second contact 108 has a U-shape when viewed from a side with a first end extended at a predetermined angle therefrom and a second end also extending at a predetermined angle therefrom. Generally, the second end has an orifice 110 therethrough, wherein that orifice 110 may interact with the second wedge 106, thus providing the necessary electrical connection through the visor to the electrical system of the vehicle or to the light or LED of the vanity depending on the design requirements of the visor 30 Generally, the second contact 108 is arranged around the second L-shaped flange 102 and in the gap between the first wedge flange 104 and the first L-shaped flange 100 to ensure the second contact 108 is secure with respect to the visor shell and hence the first contact 98 which is arranged from a side surface of the vanity door 88. It should be noted that generally the first contact 98 has a cylindrical shape and is made of a metal material that may include a predetermined diameter for the contact with a reduced diameter portion arranged between two same sized outer diameter portions. In operation, when the vanity door 88 is pivoted into an open position, the first contact 98 may rotate or pivot in one contemplated embodiment, approximately 45 degrees and come into contact with the first end of the second contact 108 thus completing the electrical circuit and allowing for electricity to flow between the electrical system of the vehicle and the lighting system arranged on the vanity 48 of the visor 30. It should be noted that any other are or path of rotation between 0 and 360 degrees may also be used. It should be noted that the first contact 98 may be electrically connected to either the vehicle electrical system or the light on the vanity 48 or vice versa, the same is true for the second contact 108. It should be noted that generally the first contact 98 and second contact 108 may be made of a metal material, however any other electrically conductive material may also be used for these contacts. It should be noted that the first L-shaped flange 100 may also include a third flange 112 extending from a top surface thereof, wherein that third flange 112 may interengage with the second end of the second contact 108. Hence, the second contact 108 generally has the second L-shaped flange 102 arranged within a gap therein and the second contact 108 is connected to the electrical system of the vehicle on the second end while the first end is arranged at a predetermined angle, in one embodiment a 45 degree angle, however any other known angle from 0 to 360 degrees may be used depending on the design requirements. The second contact 108 first end may be shaped and moved to any angle in order to provide power in relation to the first contact 98 arranged on the door 88.

The sliding thin visor 30 may also include a flush mounted universal opener assembly or member 52 that may have a bezel 114 arranged on the top outer surface of the visor body. It should be noted that buttons 116 of the flush mounted universal opener 52 generally are molded into one of the visor half shell substrates 32,34. These buttons 116 are molded therein such that they are inset, and recessed below the outer surface of the visor body. Hence, they are inset into the outer surface of one of the visor body half shells 32,34. It should be noted that the universal opener assembly 52 generally may be arranged on the outer surface of the visor half shell which is visible to the user when the visor 30 is in its up or stored position against the headliner of the vehicle. Generally, the universal opener assembly 52 may be arranged at or near one of the edges through a side surface of the visor body 30. Generally, the visor body half shell 32,34 may have an orifice arranged therethrough that generally may mimic the outer shape of the universal opener assembly 52. In one contemplated embodiment, a generally rectangular shape with fanned out top edges is used. However, any other known orifice and shape may be used for the universal opener assembly 52 of the sliding thin visor or regular visor 30 according to the present invention. The buttons 116 of the universal opener assembly 52 maybe integrated or molded directly into one of the visor half shells 32,34. At least one flexible button 116 and in the embodiment shown three flexible buttons 116 are arranged inset from a surface of one of the visor half shells 32,34. Generally, the buttons 116 have a square or rectangular shape with an orifice arranged therethrough at or near a midpoint thereof. Generally, the orifices may be of any known shape within the visor buttons 116. The three visor buttons 116 as shown in the drawings, are all attached only on one edge thereof to the visor shell 32,34. It is also contemplated that a plurality of orifices may be arranged at the intersection between the edge of the orifice of the visor half shell 32,34 and the connecting surfaces to the three buttons 116 of the universal opener assembly 52. It is also contemplated that the orifices may not be arranged along that connecting edge. Generally, the attachment of the three buttons 116 on one side surface thereof allows for the buttons 116 to be flexible and have a predetermined spring action. This may allow for the buttons 116 to be moved in a inward direction towards an opener module 118 that is arranged within the visor body 30 and then return to a home position upon release thereof. The universal opener module 118 is arranged such that it is directly adjacent to and below the orifice through one of the visor half shells 32,34. The visor half shell 32,34 may have a circular or other shaped light orifice 120 arranged directly adjacent to the opener orifice in order to allow for light to pass through the outer covering 50 of the visor 30 to show when the universal opener assembly 52 is in use, etc. The flexible buttons 116 may be molded directly into one of the visor half shells 32,34 and may allow for the flexible buttons 116 to be pushed in a downward direction towards the interior of the visor body and then return back to its normal holding position via a spring action which is designed into the plastic material that is used in the molding process. In one contemplated embodiment, a post 122 extends from a bottom surface of each of the three buttons 116, wherein the post 122 generally has a circular shape and extends a predetermined distance from the bottom surface thereof. The post 122 may interact with a switch 124 arranged on the universal opener module 118 which is secured and held in a predetermined position within the visor body 30. Hence, the suppression or pushing of the button 116 may allow for the pest 122 to interact with the switch 124 on the universal door opener module 118, thus allowing for a signal to be sent to either a garage door, lights or other components within a house or arranged near a vehicle. It should be noted that any other shape may be used for the orifice and buttons 116 of the universal door opener assembly 52 described herein. It should further be noted that any other connection methodology other than direct molding of the buttons 116 on a surface of an orifice of one of the visor half shells 32,34 may also be used. It is also contemplated in one embodiment to have the visor cover material 50 which generally is a cloth arranged directly over the buttons 116 which are inset on the outer surface of one of the visor half shells 32,34 and then place placards, screen prints or stickers identifying where the buttons 116 are arranged underneath the cloth and then have the user push directly on the outer cover on the placard or stickers arranged on the outside surface thereof in order to activate the buttons 116 of the universal door opener assembly 52. As noted above, the three buttons 116 as shown in the figures extend from an inset edge which generally defines the orifice into which the buttons 116 are arranged. As noted, these buttons 116 are recessed below the outer surface of the shell 32,34. The orifice is formed within a slight indentation such that a small pocket is formed in the outer surface of one of the visor half shells 32,34 by an angled surface which ends at the inner edge and in turn defines the shape of the orifice. The downward angle at which the pocket is formed may be adjusted depending on the design requirements. It is also contemplated to include a bezel 114 which may be secured to the buttons 116 via a locking mechanism. The bezel 114 generally has a shape that mimics that of the three buttons 116. In one embodiment, the bezel 114 has three separate tongue members which correspond to the three flexible buttons 116 and allow for the bezel 114 to be arranged on the outer surface of one of the visor half shells 32,34. The bezel tongue members may have any known shape as long as it mimics that of the buttons 116 that are arranged directly thereunder. Extending from a bottom surface of the bezel tongues is a flange 130. Generally, the flange 130 has a locking member 132 extending from a surface thereof, wherein the flange 130 generally has either a square or circular shape, however any other shape may be used. These flanges 130 may be hollow or solid depending on the design requirement. Generally, the locking member 132 may be a triangular shaped wedge extending from an outside surface of the flange 130, thus allowing for interaction and interengagement between the locking member 132 that extends from the outside surface of at least one of the flanges 130 of the bezel 114 and a surface of a button 116 adjacent to the post or peg 122 that extends from a bottom surface thereof. It should be noted that there may be only one flange 130 extending from one of the buttons 116 or a flange 130 extending from each of the three buttons 116 and a locking member 132 extending from one or all of the flanges 130 that extend from the bottom surface of the bezel 114. Hence, after the cover 50 is placed over the outer surface of the visor body 30, an orifice may be cut through the cover material 50 directly adjacent to and over the universal door opener orifice arranged through the surface of one of the visor body half shells 32,34. Then the flanges 130 may be inserted through the opening in the cover 50 and interengage with the bottom surface of the buttons 116. It should be noted that three buttons 116 have been described herein, however any other number of buttons 116 from one to ten may also be included in the flush universal door mounting assembly 116 according to the present invention. It should be noted that there is also a contemplated methodology where light may pass through each of the orifices of the buttons 116 and the light orifice 120 arranged directly adjacent to the universal opener assembly 52 in order to notify the user as to which button is active via colored or other types of light shining therethrough and through the cover 50. It is also contemplated as shown in the drawings for the universal door opener assembly 52 to be mounted into a side edge surface of the visor body which may allow the driver to use the universal door opener assembly 52 in a more ergonomically friendly manner when the visor 30 is in a stowed down position. In this side mount embodiment the buttons 116 as described above may be placed on the side of the visor 30 along the edge and when a button 116 is pressed inward the button 116 may contact and interact with the universal door opener module 118 which may be arranged therein. As described above, any number of buttons 116 may be used and the buttons 116 may have any known shape such as square and rectangular as shown in the drawings, and may also include a post that extends from a bottom surface thereof that may interact with the universal door opener module 118 arranged and secured directly adjacent thereto. It should be noted that generally all of the components of the flush mount universal door opener assembly 52 are made of a plastic material, however any other metal, ceramic, plastic, composite, natural material or any other known material may also be used for any of the components described herein.

The present invention has been described in an illustrative manner, it is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for a vehicle, said visor comprising:
a pivot rod;
a first and second shell being engageable to form a visor body;
a rail extending from a surface of said first shell;
a carrier slidably positioned in said visor body, said carrier engaged with said rail; and
a detent assembly having a housing with a generally U-shaped trough arranged in said carrier, said detent assembly having a bottom plate, said bottom plate is generally rectangular in shape, said bottom plate having at least one tab extending from an edge thereof, said housing having at least one slot arranged in a first and second side thereof.

2. The visor of claim 1 wherein said tab is arranged and secured in said slot.

3. The visor of claim 1 wherein said detent assembly having a spring arranged within said housing, said spring having a generally recurve bow shape.

4. A visor for a vehicle, said visor comprising:
a pivot rod;
a first and second shell being engageable to form a visor body;
a rail extending from a surface of said first shell;
a carrier slidably positioned in said visor body, said carrier engaged with said rail; and
a detent assembly having a housing with a generally U-shaped trough arranged in said carrier, said housing having a first notch on a first side thereof and a second notch on a second side thereof, said detent assembly having a spring arranged within said housing, said spring having a first tab extending from a first edge and a second tab extending from a second edge, said first tab is slidingly arranged in said first notch, said second tab is slidingly arranged in said second notch.

5. The visor of claim 1, wherein said detent assembly is arranged within a pocket of said carrier, said detent assembly in contact with said pivot rod.

6. The visor of claim 1 wherein said carrier engages and slides along a shelf, said shelf extends from said surface of said first shell.

7. A visor for a vehicle, said visor comprising:
a pivot rod;
a first and second shell being engageable to form a visor body;
a vanity secured to said visor body;
said vanity comprising:
a frame;
a door pivotally connected to said frame;
a first contact extending from said door; and
a second contact arranged on one of said shells, said first contact engages said second contact when said door is in an open position, said engagement between said first contact and said second contact provides power to a light of said vanity, a first end of said second contact being arranged at an approximately forty five degree angle with respect to an inside surface of said second shell.

8. The visor of claim 7 wherein said first contact having a generally cylindrical tube shape.

9. The visor of claim 7 wherein said second contact secured to one of said shells, said second contact having a generally U-shape when viewed from a side.

10. The visor of claim 7 wherein said second contact having an orifice arranged at a second end thereof.

11. The visor of claim 7 wherein said second shell having a flange, a channel and a ramp arranged therefrom, said second contact is secured within said channel and said flange is arranged within an inner gap of said second contact.

12. A visor for a vehicle, said visor comprising:
a pivot rod;
a first and second shell being engageable to form a visor body;
at least one flexible button arranged from an inset surface of an orifice through an outer surface of said first shell; and
a universal opener module arranged within said visor body directly underneath said orifice, said at least one flexible button interacts and interengages with said universal opener module.

13. The visor of claim 12 further including a bezel, said bezel is secured to said button.

14. The visor of claim 12 wherein said at least one button comprises three flexible buttons, said three buttons having a generally square or rectangular shape with an orifice arranged therethrough, said three buttons extend from an inside edge defining said orifice of said first shell, said three buttons are recessed below said outer surface of said first shell, said three buttons each having a peg extending from a bottom thereof, said peg interacts with said universal opener module.

15. The visor of claim 14 further including a bezel secured to said at least one button, said bezel having three flexible members which correspond to said three flexible buttons, said bezel having a flange extending from a bottom surface thereof, said flange having a locking surface extending from a surface thereof, said locking surface interengages and interacts with a surface of said at least one button to secure said bezel to said at least one button.

16. The visor of claim 13 further including a cover arranged over said visor body, said cover is arranged between said at least one button and said bezel.

17. The visor of claim 13 wherein said three buttons having only one side thereof connected to said first shell.

18. The visor of claim 12 wherein said at least one flexible button is arranged within a side edge of said visor body.

* * * * *